Nov. 1, 1960

E. D. GILBERT

SHOCK STRUT 2,958,400

Filed June 18, 1956

INVENTOR.
EMERSON D. GILBERT.
BY
John A. Young
ATTORNEY

INVENTOR.
EMERSON D. GILBERT.
BY
John A. Young
ATTORNEY.

Nov. 1, 1960 E. D. GILBERT 2,958,400

SHOCK STRUT

Filed June 18, 1956 3 Sheets-Sheet 3

INVENTOR.
EMERSON D. GILBERT.
BY John A. Young
ATTORNEY.

United States Patent Office 2,958,400

Patented Nov. 1, 1960

2,958,400

SHOCK STRUT

Emerson D. Gilbert, South Bend, Ind., assignor to The Bendix Corporation, a corporation of Delaware Filed June 18, 1956, Ser. No. 592,166

2 Claims. (Cl. 188—88)

This invention relates to a shock strut for aircraft which is used to absorb the impact of landing and provide resilient support for the aircraft during taxiing.

The foremost object of the invention is to reduce the weight of the aircraft by eliminating a quantity of hydraulic fluid from the strut. This weight saving can result in an over-all reduction of weight in the strut or else other structural elements which make up the strut can be increased proportionally to thereby increase the strength and load capacity of the strut at no increase in weight.

In the aircraft art, it is essential to reduce weight as far as possible since each pound of excess weight will, in general, require an additional ten pounds of aircraft weight to support it. For example, any non-essential weight in the strut is increased by ten times that amount when considering the over-all weight of the aircraft since the wings, engine, etc. must be increased to carry the extra strut weight. Obviously, it is of extreme importance to obtain a strut design which is capable of all its functional requirements and yet be as lightweight as possible.

It is one of the aims of the present invention to reduce strut weight by eliminating a quantity of hydraulic fluid. Since the fluid does not contribute to the strength of the strut, it is thereby possible to lighten the strut without any sacrifice in strut performance. Conversely, it is possible with the same weight strut to obtain a "stiffer" strut or one which is capable of increased loads.

Another object of the invention is to obtain a desired air pressure-diameter ratio (this being generally a design factor established by landing gear design specification) without necessarily introducing large quantities of hydraulic fluid.

A further object of the invention is to provide a strut, the construction of which is conducive to metering orifice simplification. This is possible since the metering orifice diaphragm is reduced in size and is so located that bending stresses thereon are reduced to a minimum.

Other objects and features of the invention will become apparent from a consideration of the following description which proceeds with reference to the accompanying drawings, wherein.

Figure 1:
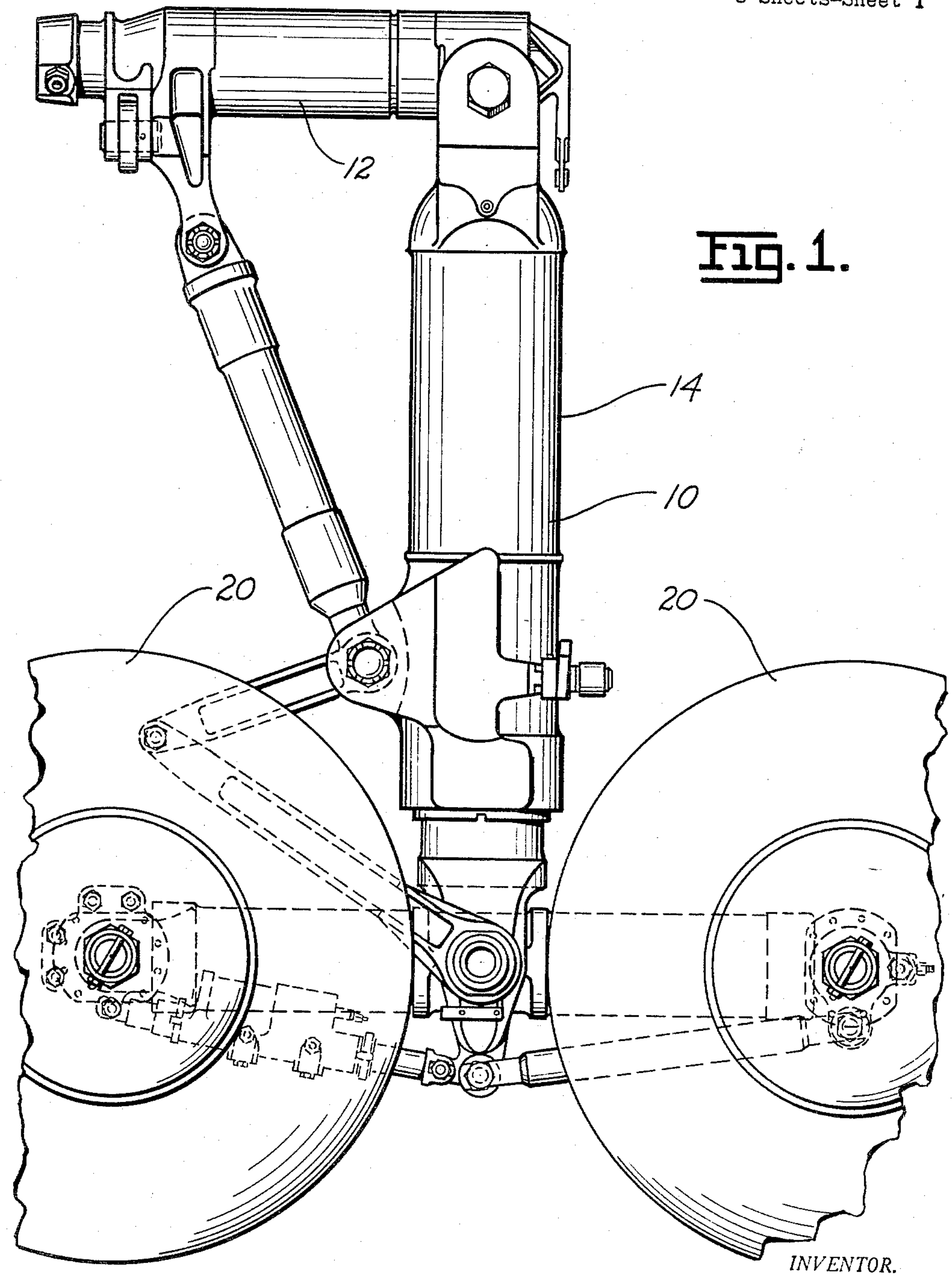
Figure 1 is a schematic view of an aircraft strut which extends from a wing or fuselage structure of the aircraft.

Referring to Figure 1, an aircraft strut indicated generally by reference numeral 10 is suspended from the under portion of the aircraft such as an aircraft wing or fuselage by means of trunnion 12. The strut is pivotally mounted on the aircraft to permit retraction of the strut when the aircraft becomes airborne.

The strut 10 comprises two coaxial relatively fixed tubular members 14 and 16 (see Figure 2) and a relatively movable tubular member 18 which operatively carries on the end thereof two pairs of ground engaging wheels 20. The relatively movable tubular member 18 is telescoped within tubular members 14 and 16 to absorb the impact of landing, and also cushion the aircraft when taxiing.

Within the strut there is a variable volume chamber 22 which is filled with hydraulic fluid. The variable volume chamber 22 increases in size as the strut extends and decreases during strut contraction to exhaust fluid therefrom. The inner fixed tubular member 16 carries a diaphragm 24. A nut 25 is screwed onto the threaded end portion of tubular member 16 to clamp the diaphragm 24 in place. A metering orifice 26 is formed in the diaphragm 24 and metering pin 28, which is operatively carried by tubular member 18, is movable through the metering orifice 26 to control the size of the orifice which is available for metering fluid therethrough. It will be noted that the end 30 of the metering tube is enlarged so that the orifice is restricted to a considerable extent at the initial period of strut contraction to offer greater resistance during the early stage of strut contraction. The specific construction of the metering pin 28 is not essential to the invention. Any metering control device can be used depending on the desired shock absorbing characteristics.

The inner fixed tubular member 16 has a number of openings 32 spaced along the length thereof. The openings 32 permit hydraulic fluid to fill the annular space provided between the two relatively fixed tubular members 14 and 16.

Figure 2:
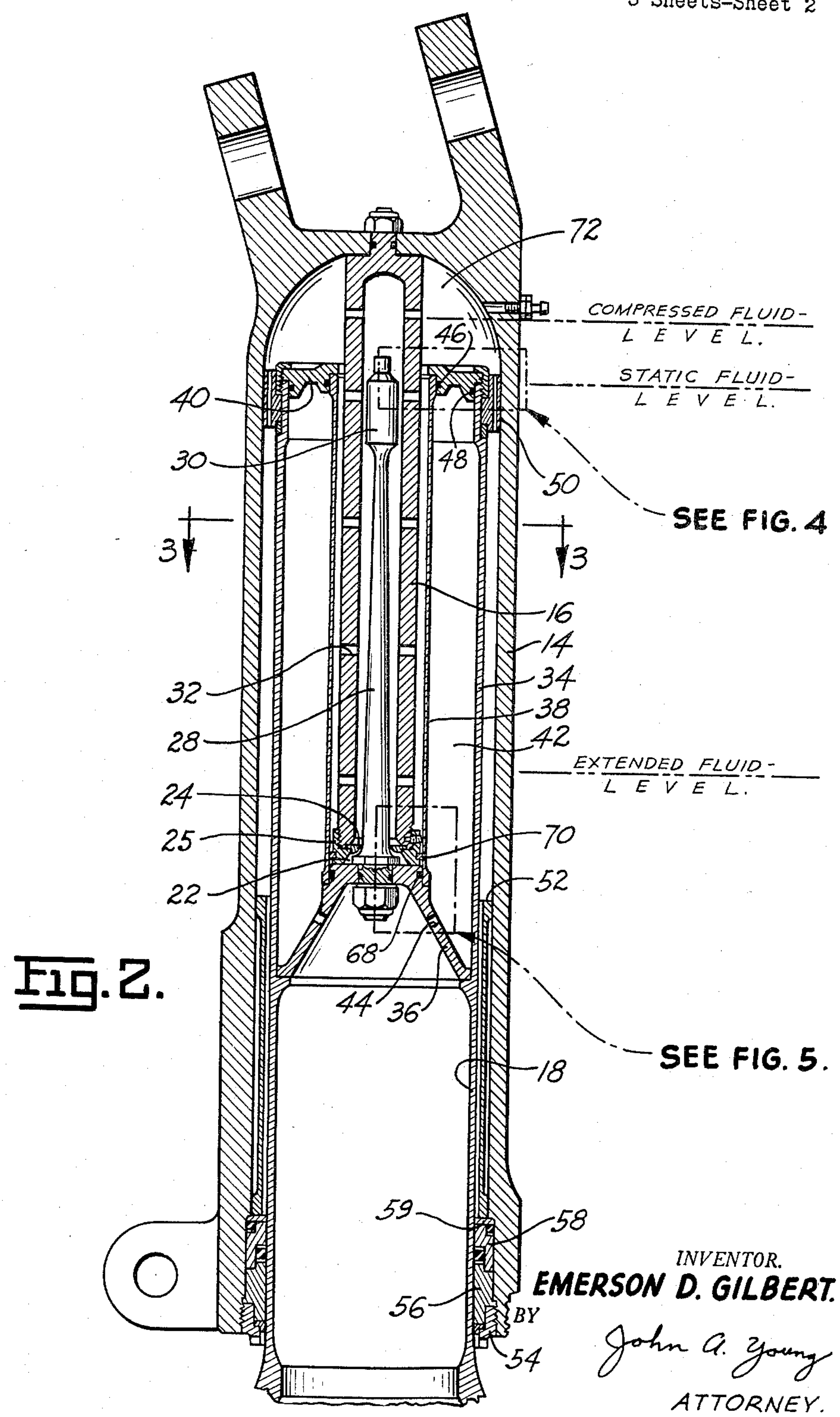
Figure 2 is an enlarged detail view of the strut shown in section.
Figure 3:
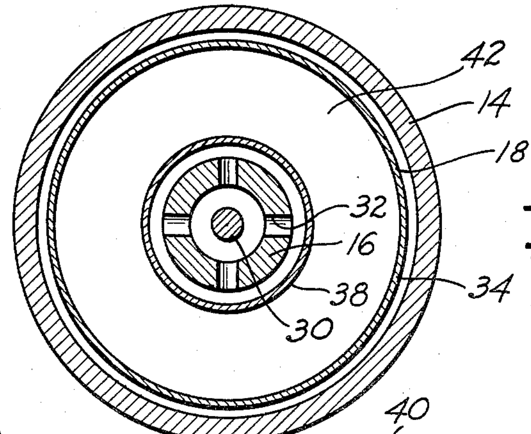
Figure 3 is a section view taken on line 3—3 of Figure 2.
Figure 4:
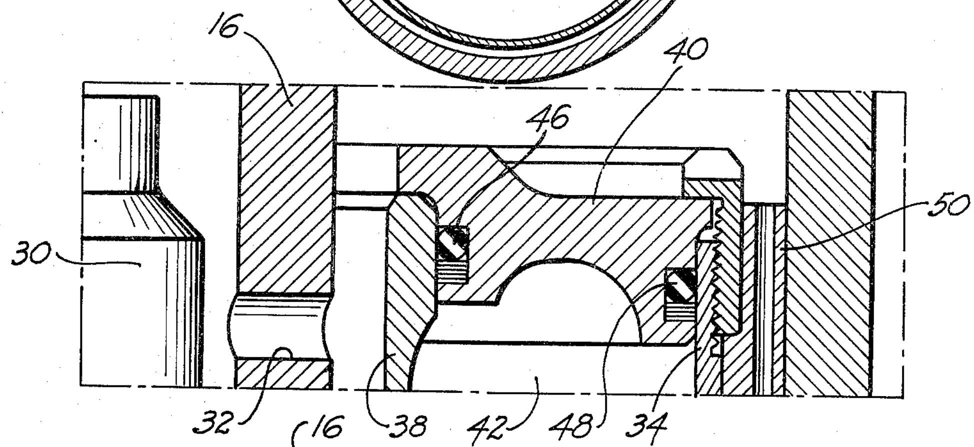
Figures 4 and 5 are fragmentary enlarged views of the indicated portions in Figure 2.

When the strut is fully extended, the level of hydraulic fluid in the annular space between the fixed tubular members 14 and 16 and within fixed tubular member 16 is indicated by the legend in Figure 2. When the strut is contracted, the liquid level rises to the level indicated by the legend in Figure 2.

The relatively movable tubular member 18 is provided with a cylindrical extension 34 and a portion 36 which is inclined toward the center line of the strut. The portion 36 has operatively connected thereto a cylindrical extension 38. At the end of cylindrical extensions 34 and 38 is an annular partition 40 which seals off the interior between extensions 34 and 38 to form a fluid tight compartment 42. The fluid tight compartment 42 is vented to the atmosphere through a passage 44 in portion 36. Three O-ring seals 46, 48, and 68 prevent hydraulic fluid leakage into the compartment 42. It will be noted that the extensions 34 and 38 and annular member 40 are immersed in the hydraulic fluid which fills the space between tubular members 14 and 16 when the strut is contracted and that the compartment 42 contained within extensions 34 and 38 and annular member 40 occupies the major portion of the space between members 14 and 16 which major portion is in excess of 50% of the total volumetric space between members 14 and 16.

The end of cylindrical extension 34 carries a tubular snubbing stop 50 which engages a spacer sleeve 52 to limit extension of the strut. The spacer sleeve 52 is supported by tubular member 14 by means of a nut 54, gland 56, and washers 58, which are pressed against a shoulder 59 in member 14.

While the strut is contracting, the liquid level in the space between fixed tubular members 14 and 16, rises and at a rate so as to be always above annular partition 40.

Figure 5:
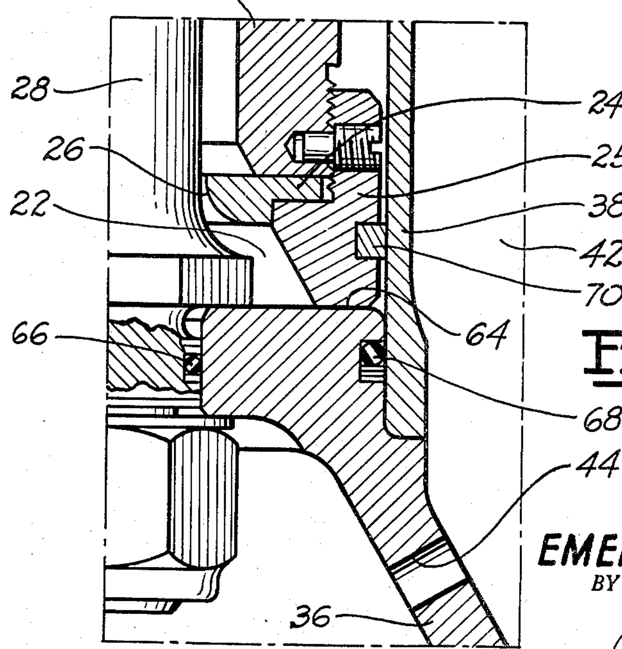

Strut contraction is limited by engagement of shoulder 64 on portion 36 with nut 25. With the strut in the position indicated in Figures 2 and 5, the tubular member 18 has telescoped to its maximum extent wherein shoulder 64 has "bottomed out" or moved into engagement with nut 25 to prevent further strut contraction. When the strut is extended from the position shown in Figure 2, the relatively movable tubular member 18 moves downwardly, thus withdrawing the cylindrical extensions 34 and 38 and the metering device 28 from the confines contained between tubular members 14 and 16. Extension of the strut increases the volume of the variable volume chamber 22.

The variable volume chamber 22 is defined in part by the inner wall of cylindrical extension 38. As the strut extends, liquid level in the strut drops and hydraulic fluid fills the expanding volume of variable volume chamber 22. O-ring seals 66 and 68 prevent leakage of fluid from the variable volume chamber 22. Sealing member 70, which is carried by nut 25, restricts fluid passage from variable volume chamber 22 (while the variable volume chamber is reducing in volume) so that liquid can be exhausted from the variable volume chamber 22 only through metering orifice 26.

Above the liquid level of the strut and contained by outer tubular member 14, there is entrapped a quantity of air so that as the liquid rises the air (or other gas) is compressed to build up a resistance to strut contraction. This air pressure increases as the liquid level rises so that resistance to strut contraction is in proportion to the degree of strut contraction. The compressed air provides a resilient cushion which supports the aircraft through tubular member 18.

It was previously the practice in strut constructions, to fill the entire volume contained between the fixed concentric tubular members 14 and 16 with hydraulic fluid. By means of the compartment 42, however, the quantity of hydraulic fluid required for operation of the strut is drastically reduced by the volume of this compartment and there is a resulting weight saving represented by the reduction in quantity of the hydraulic fluid. In some struts, the amount of fluid which can be eliminated is as high as sixty pounds. A typical weight for the extensions 34, 38, plug 40 and other added items is about thirty pounds so that there is an over-all weight saving of approximately thirty pounds per strut. This weight saving is realizable as an over-all reduction of strut weight or it can be absorbed in increasing the size of tubular members 14 and 18 so that a more rigid strut is provided with the same weight as the previous struts.

Variable volume chamber 22 is reduced in volume since it is bounded by the inner surface of extension 38. With the reduced diameter of tubular member 38, the strength-weight ratio of diaphragm 24 and nut 25 is increased. Previously, the diaphragm was supported by a tubular member corresponding to extension 34. This arrangement gave little flexural support to the diaphragm and because of the stresses imposed thereon, it was necessarily made more rigid and of thicker materials than is the case with the present invention.

It frequently occurs in strut manufacture that a given ratio is specified for maximum air pressure in chamber 72 to diameter for strut 18. Assuming that the pressure in 72 is already established, the only way to meet this requirement is to increase the diameter of tubular member 18. If fluid is to be contained by tubular member 18, this necessarily represented a considerable increase in volume of fluid and thus weight to the strut. With the present invention, however, an increase in diameter of tubular member 18 is not necessarily accompanied by an increase in volume of hydraulic fluid required for strut operation. It is thus possible to meet the specified pressure-diameter ratio without introducing a factor of increased weight.

The operation of the strut will next be considered. Telescopic movement of tubular member 18 reduces the volume of variable volume chamber 22, thus exhausting fluid therefrom through metering orifice 26. Resistance to fluid transfer across the metering orifice 26 depends upon the available metering area, this being determined by metering pin 28. At the initial stage of strut contraction, the enlarged end portion 30 of the metering pin 28 restricts metering orifice 26 to a maximum amount thus offering considerable resistance to initial telescoping movement of tubular member 18. As the strut continues to telescope, enlarged end portion 30 moves through the diaphragm 24 so that the available area of metering orifice 26 is increased and resistance to telescopic movement is decreased. Fluid is transferred from the variable volume chamber 22 into the space contained within tubular member 16. Openings 32 permit hydraulic fluid to fill the space between fixed tubular members 14 and 16. As the strut contracts, extensions 34 and 38 are thrust into the annular space contained between tubular members 14 and 16 to decrease the available liquid containing volume thereof. As the liquid level rises within tubular member 14, the air pressure above the liquid level increases owing to its reduction in volume. When the strut has completed telescopic movement, the kinetic energy of the aircraft is effectively dissipated. The energy stored in the air during the contraction of the strut is put to work in extending the strut from fully compressed position to static position, this being defined as that position of the strut which will support the static weight of the airplane. The aircraft is now supported on a resilient cushion of compressed air which serves to absorb part of the jarring and bumping of the aircraft during taxiing.

When the aircraft takes off, and the weight of the aircraft is transferred from the wheels to the wings of the aircraft, the air pressure in chamber 72 forces the strut to extend, thus withdrawing the extensions 34 and 38 and metering pin 28 from the confines between tubular members 14 and 16. The liquid level in the strut drops as fluid is transferred across diaphragm 24 to fill the increasing volume of variable volume chamber 22.

Although this invention has been described in connection with a single example embodiment, it will be understood that the principles disclosed herein are exemplary of the invention and it is not my intention that the example embodiment be interpreted as restrictive thereof.

I claim:

1. In a shock strut two fixed coaxial tubular members, said inner tubular member having a plurality of apertures spaced along the length thereof permitting hydraulic fluid introduced within the inner tubular member to flow into the confines defined by said inner and outer fixed tubular members, a third tubular member slidably movable relatively to said two fixed coaxial tubular members, a variable volume chamber arranged within said third tubular member to exhaust fluid therefrom during strut contraction, means for metering fluid from said varaible volume chamber and into the inner fixed tubular member, a hollowed fluid tight projection operatively carried by said third tubular member which is projected within the confines between said fixed tubular members responsively to contraction of the strut to occupy the major portion of the volume therebetween, said fluid tight projection extending in length substantially equal to the length of the stroke of said shock strut, and having an annular space therein which is sealed against communication with said hydraulic fluid and means providing bearing between said projection and said outer tubular member.

2. In a shock strut, a fixed outer tubular member, a coaxial inner fixed tubular member having a plurality of fluid permitting apertures spaced along the length thereof, a diaphragm carried by the end of said inner tubular member, said diaphragm having a metering orifice therein, a movable tubular member telescopically mounted in said fixed outer tubular member, means operatively carried by said movable tubular member and arranged in combination with said metering orifice to control the effective area for fluid passage through said orifice, a variable volume fluid chamber located on one side of said diaphragm which exhausts fluid through said metering orifice during strut contraction, a second fluid chamber formed on the other side of said diaphragm and defined within the inner fixed tubular member, a sealed annular compartment carried by said movable tubular member at the end thereof, said annular compartment being substantially equal in length to the stroke length of said strut and constituting a volume occupying a major portion of the space between said fixed outer and coaxial fixed inner tubular members, said annular compartment being in sliding contactive engagement with said outer and inner fixed tubular members to reduce the available volume for containing fluid therebetween.

References Cited in the file of this patent

UNITED STATES PATENTS

| | | |
|---|---|---|
| 2,039,135 | Waugh et al. | Apr. 28, 1936 |
| 2,084,320 | Coleman | June 22, 1937 |
| 2,423,736 | Tack | July 8, 1947 |
| 2,559,633 | Katz | July 10, 1951 |
| 2,655,232 | Etherton | Oct. 13, 1953 |